United States Patent
Patel (10) Patent No.: US 6,252,644 B1
(45) Date of Patent: Jun. 26, 2001

(54) WEDGE-SHAPED LIQUID-CRYSTAL CELL HAVING NONLINEAR GAP

(75) Inventor: Jayantilal Patel, State College, PA (US)

(73) Assignee: Tellium, Inc., Oceanport, NJ (US)

(*) Notice: Subject to any disclaimer, the term of this patent is extended or adjusted under 35 U.S.C. 154(b) by 0 days.

(21) Appl. No.: 09/197,694

(22) Filed: Nov. 23, 1998

Related U.S. Application Data (63) Continuation of application No. 08/780,925, filed on Jan. 9, 1997, now Pat. No. 5,841,500.

(51) Int. Cl.[7] .................................................. G02F 1/13
(52) U.S. Cl. .................................................. 349/196; 349/158
(58) Field of Search .................................. 349/158, 155, 349/141, 196

(56) References Cited

U.S. PATENT DOCUMENTS

| | | | |
|---|---|---|---|
| 3,772,874 | * 11/1973 | Lefkowitz | 349/142 |
| 4,561,726 | * 12/1985 | Goodby et al. | 349/135 |
| 4,974,940 | * 12/1990 | Asano et al. | 349/101 |
| 5,047,847 | * 9/1991 | Toda et al. | 349/200 |
| 5,150,236 | * 9/1992 | Patel | 349/198 |
| 5,414,540 | * 5/1995 | Patel et al. | 349/196 |
| 5,414,541 | * 5/1995 | Patel et al. | 349/196 |
| 5,648,859 | * 7/1997 | Hirabayashi | 349/196 |
| 5,659,411 | * 8/1997 | Nito et al. | 349/117 |
| 5,841,500 | * 12/1998 | Patel | 349/141 |

* cited by examiner

Primary Examiner—Kenneth Parker
(74) Attorney, Agent, or Firm—Morgan, Lewis & Bockius LLP (57) ABSTRACT

A liquid crystal, cell having plates defining a gap between them which is filled with a liquid crystal, especially a twisted nematic. The plates are made non-parallel to a predetermined degree so that the liquid crystal assumes a wedge shape, producing different effective thicknesses of the liquid crystal depending on the lateral position within the cell. In use, a narrow beam irradiates a portion of the cell, and the cell is positioned along the wedge direction so as to optimize the cell performance. The invention is particularly useful with a liquid-crystal multi-wavelength switch, which requires extinction ratios between the two states of the cell.

20 Claims, 5 Drawing Sheets

WEDGE-SHAPED LIQUID-CRYSTAL CELL HAVING NONLINEAR GAP

This is continuation of application Ser. No. 08/780,925 filed on Jan. 9, 1997 now U.S. Pat. No. 5,841,500.

FIELD OF THE INVENTION

The invention generally relates to liquid-crystal optical devices. In particular, the invention relates to a mechanical structure for establishing the gap of the cell into which the liquid crystal is filled and to a method of optimizing the optical performance of a liquid-crystal cell.

BACKGROUND ART

Liquid-crystal modulators are well known. They are most prevalently used in displays ranging in size from wrist watches to flat-panel displays on lap top computers. In such displays, the bias applied to the pixel of the multi-element cell, when used in combination with polarizers, determines whether the pixel absorbs or passes light. Since the output is directly viewed, the ratio of the light passed in the transmissive mode to the light passed in the absorptive mode need not be very high. This ratio is referred to as the extinction ratio for a liquid-crystal cell.

Specialized liquid-crystal optical modulators are also known in which a single, well defined beam strikes the modulator and its intensity is modulated according to the electrical bias applied across the liquid-crystal cell. Many applications of optical modulators require a high extinction ratio.

A relatively new application of liquid crystals involves optical switches in a multi-wavelength optical communication. Brackett et al. in "A scalable multiwavelength multihop optical network: a proposal for research on all-optical networks," *Journal of Lightwave Technology*, vol. 11, no. 5/6, 1993, pp. 736–753 describe an all-optical communication network based on optical fibers, each carrying multiple optical signals of different carrier wavelengths. The all-optical network requires for its most useful applications switching nodes connecting multiple fibers that can switch the different optical signals between three or more fibers or other optical paths according to their wavelength, all the while the signals are maintained in the optical domain, that is, without any electro-optical conversion.

One type of such optical switch is the liquid-crystal switch described by Patel and Silberberg in U.S. Pat. Nos. 5,414,540 and 5,414,541, both incorporated herein by reference, and in "Liquid Crystal and Grating-Based Multiple-Wavelength Cross-Connect Switch," *IEEE Photonics Technology Letters*, vol. 7, no. 5, May 1995, pp. 514–516. A schematic representation of a 2-wavelength switch based on this technology is illustrated in perpendicularly arranged views in FIGS. 1 and 2. A two-wavelength optical beam 10, assumed in this simple example to be polarized in they-direction, strikes a frequency-dispersive element 12, such as a Bragg grating to produce two optical beams 14, 16 separated according to their wavelengths. A lens 18 may be required to produce the required optical configuration. The two beams 14, 16 strike respective segments 20, 22 of a segmented liquid-crystal modulator 24 after passing through a first polarization-dispersive element 26, such as a calcite crystal or Wollaston prism. The calcite crystal 26 is arranged such that the y-polarization corresponds to the ordinary polarization of the calcite. The utility of the first polarization-dispersive element 26 is not readily apparent in this simple explanation, but its need become more obvious when two input beams are being switched in an add/drop circuit.

Many aspects of the invention are not directly dependent upon the use of a liquid-crystal modulator, but that example will be used here for definiteness. Each segment 20, 22 of the liquid-crystal modulator 24 constitutes a separately controllable liquid-crystal modulator. More details will be given later, but the liquid-crystal cell 24 has been previously used in configurations which typically include two glass plates with a gap between them which is filled with a nematic liquid crystal. In one embodiment, one side of the segmented modulator 24 has a uniform biasing electrode while the other has an array of electrode fingers. In this configuration, states of polarization are use for switching, as discussed in the cited Patel and Silberberg patents. Depending upon whether electrical bias is applied to the respective segment 20, 22 the polarization of the beam 14, 16 striking the segment either is left in its y-polarization or is rotated by 90° to the x-polarization, which is the extraordinary polarization with respect to the two calcite crystals 26, 28.

Figure 2:
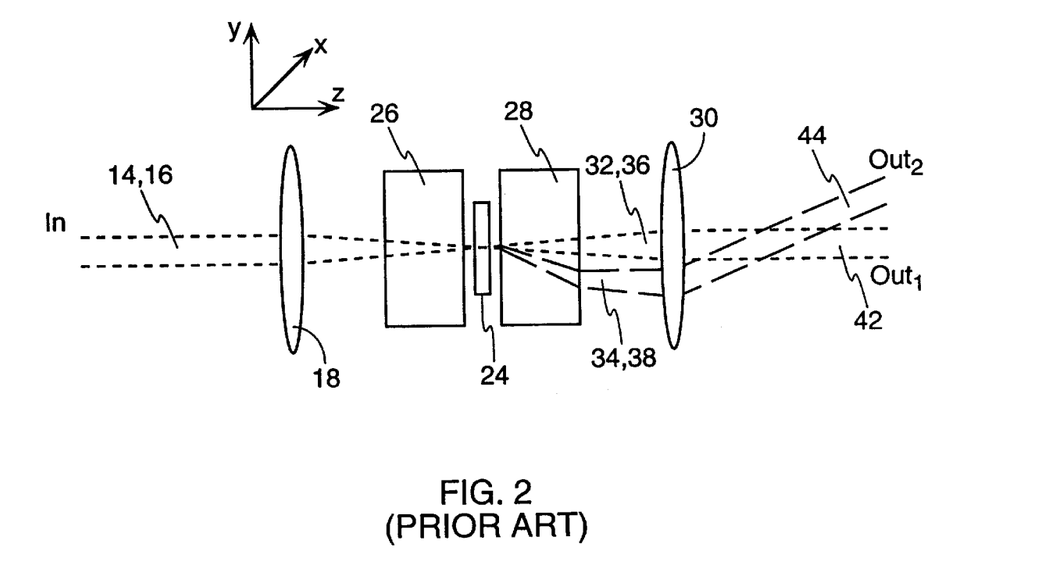

After the beams 14, 16 have passed through the liquid-crystal modulator 24 with perhaps the polarization state of one or the other of the two wavelength signals being rotated, the beams pass through a second polarization-dispersive element 28. As shown in FIG. 2, the polarization-dispersive element 28 distinguishes the polarization states of the beams 14, 16 and accordingly transmits the ordinarily polarized light into beams 32, 36 (FIG. 2) and transmits the extraordinarily polarized light into beams 34, 38. Following focusing by a second lens 30, a second wavelength-dispersive element 40 recombines the two beams into either first output beam 42 or second output beam 44, the two output beams 42, 44 being of different polarizations. If the beams exiting the second polarization-dispersive element 28 are of different polarizations, one is directed to the first output beam 42 and the other to the second output beam. It is understood that the two segments 20, 22 allow this switching to be performed independently for each wavelength. Thus, the electrical biasing conditions determine onto which output beam 42, 44 each of the two wavelength-differentiated signals 14, 16 are switched.

This explanation is intended only as an example of the type of multi-wavelength optical switching that is provided by liquid-crystal cells. The example will be used to illustrate some problems addressed by the invention. Many other configurations of liquid-crystal switches and modulators are included within the invention.

The above optical switching networks do not depend critically upon the modulator being based upon a liquid crystal. Such a switching network, particularly when applied to multiple input beams and to beams of mixed polarization, depends upon a selective polarization converter that in one state can pass the light with its polarization unchanged and in another state simultaneously converts TE-polarized light to TM-polarized light and vice versa.

Figure 3:
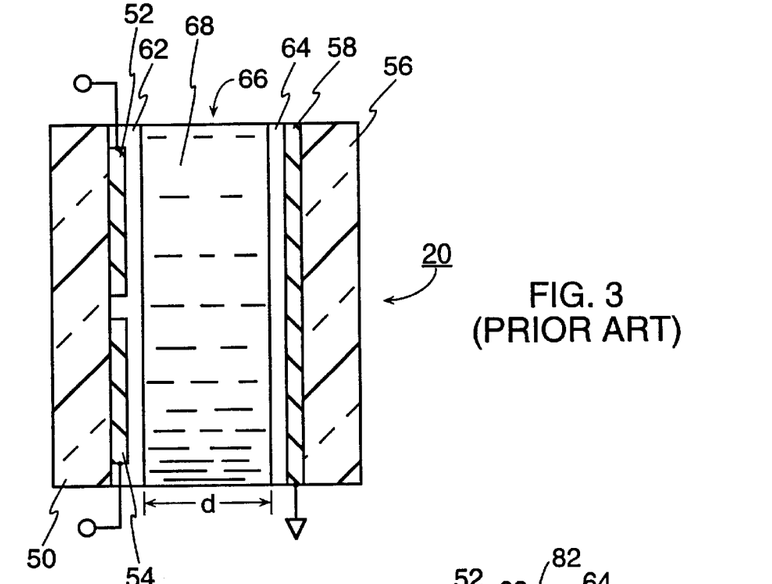
FIG. 3 is a schematic cross-sectional view of a conventional liquid-crystal cell for use in the switch of FIG. 1.

A schematic cross-sectional view of a conventional segmented liquid-crystal modulator 20 is shown in FIG. 3. On one transparent glass plate 50 are formed two semi-transparent electrode fingers 52, 54, for example, of indium tin oxide (ITO), which are connected to respective biasing sources. On the other transparent glass plate 56 is formed a semi-transparent planar counter-electrode 58, also of ITO, typically grounded or biased to a fixed potential. Alignment layers 62, 64 of an organic dielectric material are deposited over the electrodes on both glass substrates 50, 56. The alignment layers 62, 64 are buffed in predetermined directions that are perpendicular to each other when the substrates 50, 56 are assembled together. Typically, the buffing direction on the first substrate 50 is along the long direction of the finger electrodes 52, 54. The two glass substrates 50, 56 are then assembled into a liquid-crystal cell with the buffing directions perpendicular between them and with a gap 66 of thickness d between the two alignment layers 62, 64.

A nematic liquid crystal 68 is then filled into the gap 66. Because of the perpendicularly buffed alignment layers 62, 64, the director of the liquid crystal (i.e., the direction of the long axis of the molecules constituting the liquid-crystal 68) is fixed at the surfaces of the respective alignment layers 62, 64 to lie along the respective buffing directions. In the absence of other forces, the director smoothly varies between the two alignment layers 62, 64. That is, its vector head follows a helix, and the liquid-crystal molecules resemble a 90° screw between the two alignment layers.

Nematic cells for optical displays should satisfy the Mauguin condition, which for a 90° twist is stated as $$\Delta n \cdot d \gg \frac{\lambda}{2}, \tag{1}$$

where $\Delta n$ is the difference in refractive index between the two principal directions of the liquid crystal molecule, d is the thickness of the liquid crystal in the cell, and $\lambda$ is the wavelength of the light. If a beam of light of light traverses such a gap 66 filled with a twisted liquid-crystal structure and if the light's polarization is parallel or perpendicular to the alignment direction of the incident side, and if the pitch of the helix is sufficiently long to satisfy the Mauguin condition, the helically wound liquid crystal will waveguide the light. As a result, the polarization of the traversing light beam is twisted substantially by 90° upon traversing the liquid-crystal cell in this state.

However, if the electrodes 52, 54, 58 impose an electric field of sufficiently high magnitude across the liquid crystal 68, the liquid-crystal director is forced to be parallel to the electric field which exists across the gap 66 except in areas immediately adjacent to the alignment layers 62, 64. Thereby, the electric field destroys the waveguiding, and the light exits the cell 20 with the same polarization with which it entered. By the appropriate placement of polarizers and analyzers relative to the alignment directions, the voltage applied across the liquid-crystal will change the light characteristic of the cell transmissivity between blocking and transmissive.

Since the twist of the director between the two alignment layers 62, 64 could be either +90° or −90°, a chiral dopant is typically added to the liquid crystal 68 to break the symmetry by inducing the twist only in one helical direction, and to thereby avoid scattering from different domains. This solution is well known in the prior art.

For most display applications, extinction ratios of 100:1 (20 dB) or even 10:1 (10 dB) are acceptable for adequate viewing quality. However, the liquid-crystal multiwavelength optical switch of FIGS. 1 and 2 and other such switches present much more stringent requirements. In view of the fact that the output wavelength-dispersive element 40 passes any remnants of a blocked channel onto the output beams 42, 44, a finite extinction ratio is equated with cross talk between channels. For a practical all-optical networks, cross talk introduced by the switching elements needs to be kept as low as possible. For example, if there are two input beams each having the same wavelength comb of signals, a finite extinction ratio means that an output path will carry both the transmitted signal at a particular wavelength switched to that output path as well as residual amounts of the blocked signal at that same wavelength which was principally switched to another output path.

A principal cause for finite extinction ratios in liquid-crystal cells is that the Mauguin condition of Equation (1) is only approximately satisfied in most practical liquid-crystal cells. Scheffer et al. give a more complete expression for the transmissivity T of light through parallel polarizers sandwiching a 90° twisted nematic liquid crystal in "Twisted Nematic and Supertwisted Nematic Mode LCDs," *Liquid Crystals: Applications and Uses*, vol. 1, ed. Bahadur (World Scientific, 1990), pp. 234–236, specifically, $$T = \frac{\sin^2\left(\frac{\pi}{2}\sqrt{1+u^2}\right)}{1+u^2}, \tag{2}$$

where $$u = \frac{2d \cdot \Delta n}{\lambda}, \tag{3}$$

with the previously defined quantities. The transmissivity T thus depends upon the thickness d with the dependence defined in Equation (2). Although the transmissivity T is relatively small for values of u greater than 1, it assumes a zero (minimum) value only for a discrete set dependent upon the positive even integers $$\sqrt{1+u^2} = 2, 4, 6, \ldots, \tag{4}$$

which can be alternately expressed as $$u = 1.732, 3.873, 5.916, \ldots \tag{5}$$

The values stated in either Equation (4) or (5) are known as the first, second, and third minimum conditions respectively and represent conditions for which exact polarization conversion occurs.

Thus, only for discrete values of cell thickness d does the extinction coefficient assume an infinite value. For laboratory purposes, the liquid-crystal cells can be customized and the optical setup temporarily optimized to achieve nearly ideal characteristics. However, as the liquid-crystal optical switches move out of the laboratory into the field, such stringent cross-talk requirements are becoming very difficult to achieve with the conventional liquid-crystal cell. Cells used in verifying the invention have typical lateral dimensions of about ½ inch (1 cm) and maintaining gaps of a few micrometers, as required for complete matching of the gap to the minimum condition of Equation (4) or (5) over these dimensions has generally been infeasible with reasonably priced components and simple fabrication techniques.

SUMMARY OF THE INVENTION

The invention can be summarized as a liquid-crystal cell in which the gap has a wedge shape and into which is filled the liquid crystal. A beam irradiating the cell has a lateral size small compared to the variation width of the wedge. During use, the beam or cell are positioned such that the beam is caused to irradiate the spot of the cell exhibiting optimum performance. That is, the width of the gap is selected which provides the best characteristics.

DETAILED DESCRIPTION OF THE PREFERRED EMBODIMENTS

Figure 1:
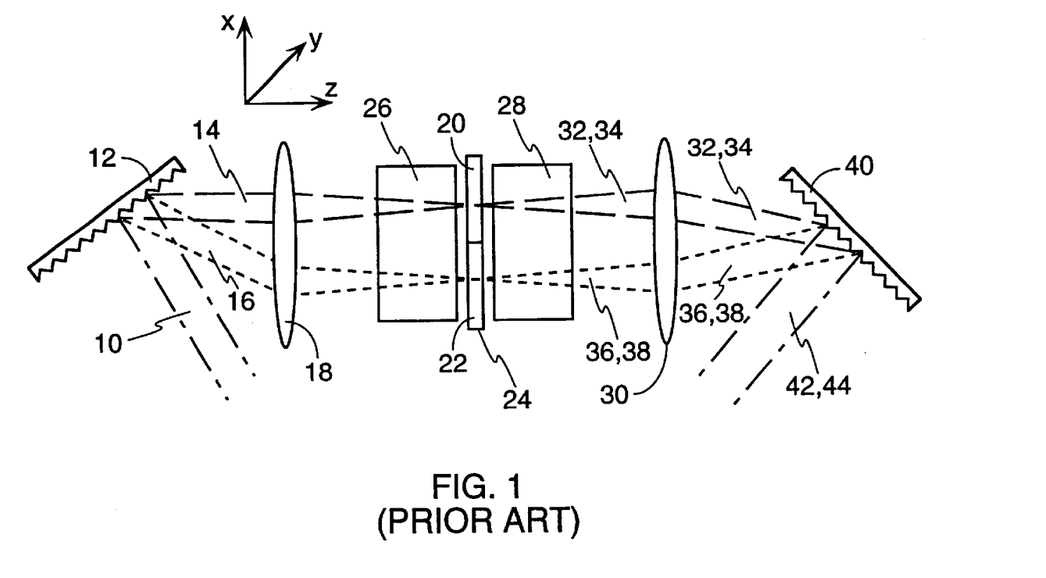
FIGS 1 and 2 are perpendicularly arranged schematic side views of a liquid-crystal optical switch, particularly for use in a multi-wavelength optical communication system.
Figure 4:
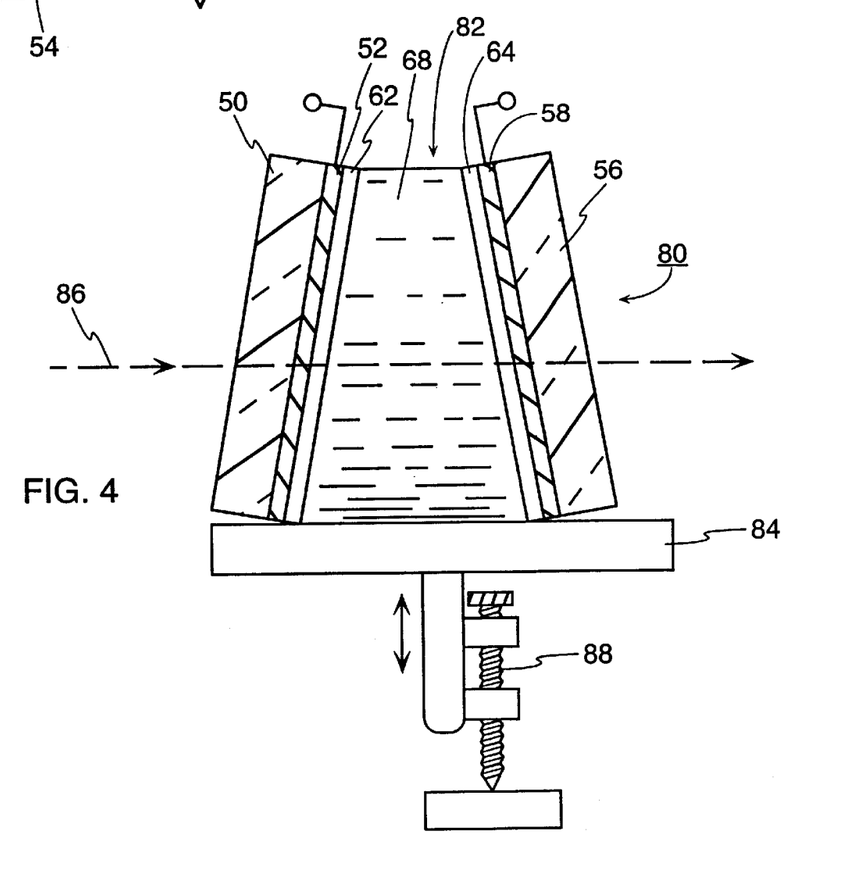
FIG. 4 is a schematic cross-sectional view of a liquid-crystal cell according to the invention.
Figure 5:
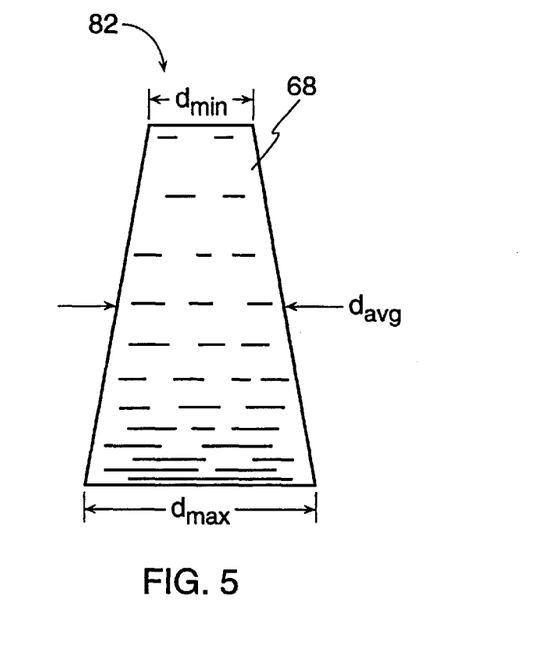
FIG. 5 is a portion of the cross section of FIG. 4 showing important dimensions.

A schematic representation of an embodiment of the invention is shown in FIG. 4. A wedge-shaped liquid-crystal cell 80 includes the conventional glass substrates 50, 56, electrodes 52, 58, and buffed alignment layers 62, 64. Only a single electrode 52 is shown on the lefthand side since many aspects of the invention apply to non-segmented liquid-crystal cells. According to the invention, a wedge-shaped gap 82, illustrated more geometrically in FIG. 5, is established between the glass substrates 50, 56 and their attached layers 52, 58, 62, 64. An example of the means for establishing the gap 82, that is, the means for fixing the two glass substrates in this geometry, will be discussed later, but any mechanical or other structure that performs this function will conform to the invention. The nematic liquid crystal 68 is filled into the wedge-shaped gap 82. A light beam 86, such as the light beams 14, 16 of FIG. 1, is incident upon the wedge-shaped cell 80, preferably near its middle portion and preferably approximately perpendicularly to the symmetry axis of the wedge. The lateral size of the light beam 86 in the variation direction of the wedge, vertically as illustrated, is relatively small compared to the wedge variation scale, as defined in Equations (2) through (5).

As shown in FIG. 5, the wedge-shaped gap 82 has an average gap of size $d_{avg}$ disposed at the middle of the extremal gaps of sizes $d_{min}$ and $d_{max}$. For clarity of exposition, the acuteness of the gap 82 is exaggerated in the drawings. In typical uses, it is anticipated that variation in the gap ranges from a few percent upwards to 30% or perhaps even more for difficult structures, depending on the beam sizes being employed. The important consideration is that the variation be sufficient to accommodate the expected variations in the gap due to manufacturing tolerances and operational fluctuations.

The average gap size $d_{avg}$ is selected to be near one of the minima of Equation (4) or (5), and the extremal values $d_{min}$ and $d_{max}$ are chosen to include any expected variations. The design values of $d_{min}$ and $d_{max}$ can be chosen to correspond to neighboring maxima of Equation (2) with a minimum falling in between. Since the beam width is required to be small, the entire beam can be characterized by a selected point of the dependence of Equation (2).

The wedge-shaped cell 80 is mounted on a support 84 that is movable along the wedge direction along which the gap size varies, that is, vertically as illustrated. Whether the small end or the large end of the wedge-shaped cell 80 is mounted on the support 84 is not material to the fundamental aspects of the invention.

The vertical movement of the wedge-shaped cell 80 can compensate for variations in the effective cell thickness caused by fabricational errors, component irregularities, or thermal effects. In operation, the wedge-shaped cell 80 is placed near its medial position illustrated in FIG. 4. Then, the support 84 is moved vertically upwards or downwards to achieve the optimal performance believed to be provided when the true gap size, that is, the size of the physical gap at the position of the light beam 86 equals the design gap size. For example, the segmented liquid-crystal modulator 24 of FIG. 1 may be redesigned to have a wedge shape with both segments 20, 22 extending along the variation direction of the wedge. Then, its vertical position is adjusted to minimize the cross talk between the multi-wavelength channels. The vertical movement may be provided by a number of mechanisms. For initial tuning, a manually turnable screw 88 may control a translatable stage to which the support 84 is attached or a cell support can be slid to an optimal position and clamped there. Automatic means may be used for the dynamic control when other factors are influencing the gap size.

Experiment

Figure 6:
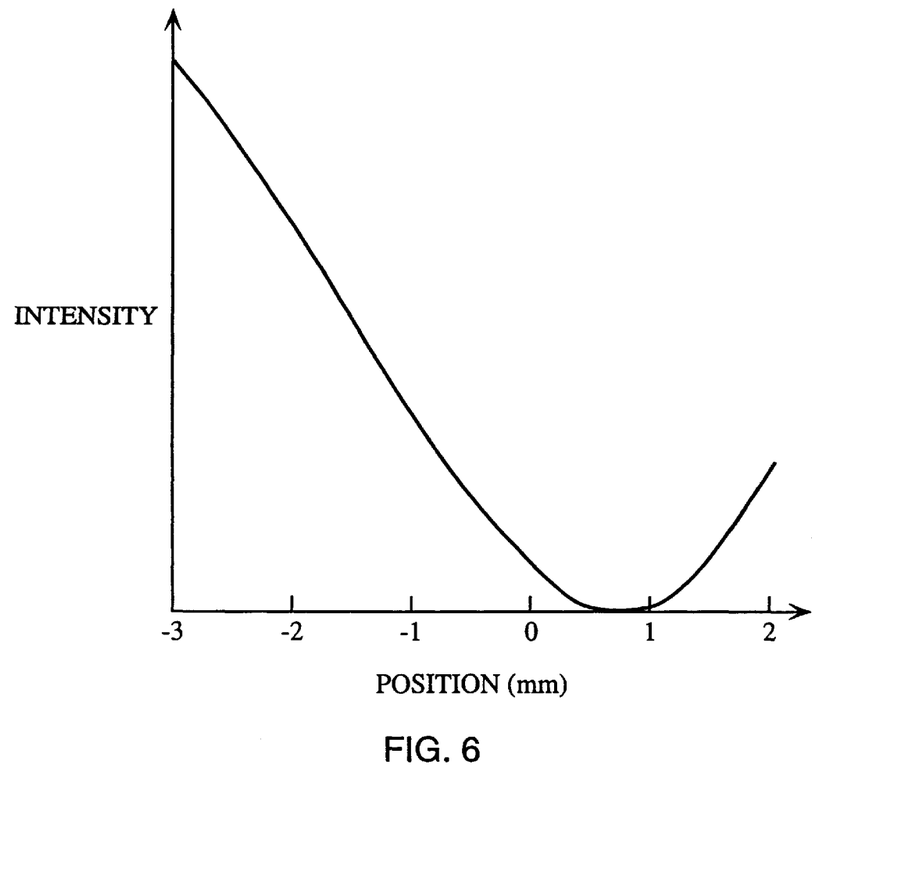
FIG. 6 is a graph of the optical transmission characteristic of a wedge-shaped liquid-crystal cell as a function of position along the wedge.

A wedge-shaped liquid-crystal cell was fabricated having thickness varying between 6 μm and 8 μm, as established by techniques to be described later. It was placed between parallel polarizers, and the optical intensity transmitted through the cell at a wavelength of 635.8 nm was measured as the cell was moved along the wedge direction. The results are shown in FIG. 6 with a linear intensity scale with zero at the origin. An arbitrary elevation of the liquid-crystal cell was chosen as the zero reference, and the minimum in transmission (corresponding to maximum in extinction coefficient) was determined to be about 750 μm away from this point. The graph shows the significant variations in transmission caused by variations in gap size over a range significantly less than 6 μm and 8 μm, but that substantially zero transmission can be obtained for a precisely controlled elevation. Transmissivity measurements, as done for FIG. 6, performed with parallel polarizers can be used to optimize the beam position on the wedge-shaped twisted nematic cell.

Figure 7:
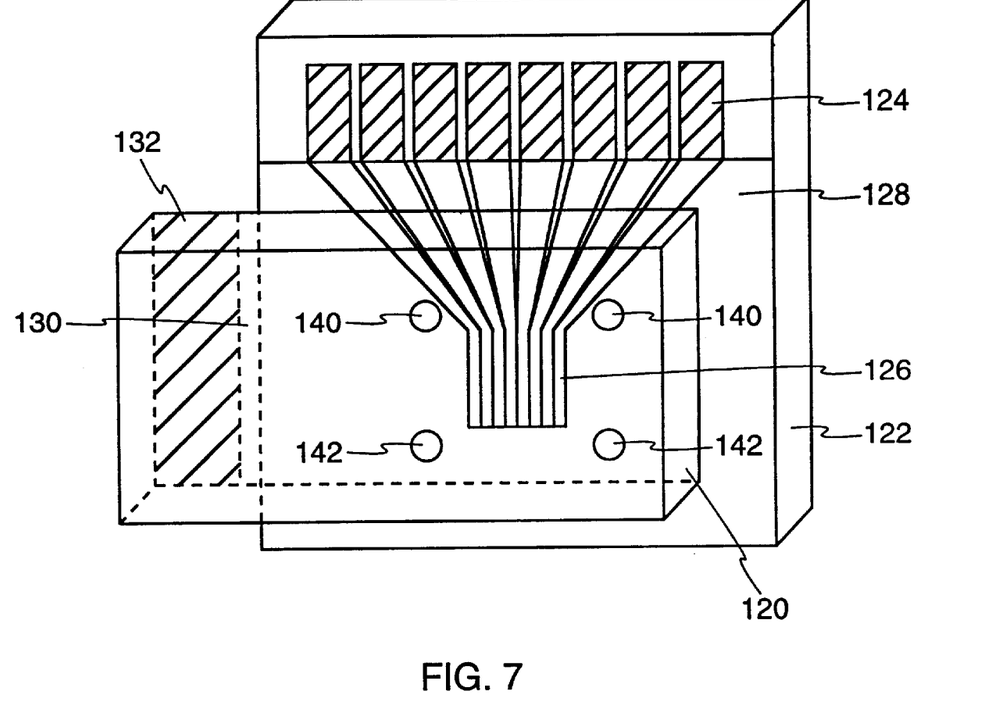
FIG. 7 is an orthographic view of an embodiment of the liquid-crystal modulator.

The fabrication of an embodiment of a wedge-shaped liquid-crystal cell 5 will now be described with reference to the orthographic view of FIG. 7. The lateral dimensions of this figure are approximately to scale and extend over about 1 inch (2.54 cm). A uniform substrate 120 and a patterned substrate 122 are both composed of optical-quality soda-lime float glass, which can be purchased from Donnelly Applied Films Corp of Michigan already coated with a layer of indium tin oxide (ITO). The patterned substrate 122 is photolithographically formed with the illustrated pattern of eight fairly large contact pads 124 connected to respective smaller finger electrodes 126, with the ITO being etched with a conventional etching solution of HCl or $H_2O:HCl:HNO_3$. Both the patterned and unpatterned substrates 120, 122 may be coated with protective dielectric layers 128, 130 of $SiO_2$ except on the ends of the finger contact pads 126 on the patterned substrate 122 and a back contact pad 132 on the unpatterned substrate 120.

An organic dielectric to form the alignment layers is then spun onto the dielectric protective layers on both the unpatterned and patterned substrates 120, 122 and thereafter thermally cured. The alignment material may be an organic layer such as a polymer or polyimide, as described in U.S. Pat. No. 4,561,726 to Goodby et al. The alignment layers of both substrates 120, 122 are then buffed along respective directions. As illustrated, the alignment layer of the patterned substrate 122 is buffed in the vertical direction parallel to the finger electrodes 126 and that of the unpatterned substrate 120 is buffed in the horizontal direction. In the preceding steps, the two substrates 120, 122 have been processed as separate assemblies.

Up to this point, the processing has generally followed the procedures presented in U.S. Pat. No. 5,150,236 to Patel, and the next step of establishing the gap between the two substrates 120, 122 also generally follows those procedures with one major exception. Two pairs of spacers 140, 142 establish the wedge-shaped gap 82 between the substrates 130, 132. The first pair 140 has a larger thickness than does the second pair 142 although the relative sizes may be reversed. Typical sizes are 6 μm for the smaller pair 142 and 8 μm for the larger pairs 140 since the design thickness is near to 7 μm.

In preparing the spacers 140, 142, two sizes of glass spacer rods are suspended in respective solutions of isopropyl alcohol. The sized spacer rods may be purchased from a commercial vendor, such as E.M. Chemical of Hawthorne, New York. The two solutions are applied to the areas of the respective pairs of spacers 140, 142 surrounding the active area of the patterned substrate 122. The alcohol wets the thin glass rods so that they slide over each other as the alcohol evaporates and all finally rest firmly on the alignment layer of the patterned substrate 122. Thereby, the rods are prevented from being piled on top of each other, which piled arrangement would cause an uncertain thickness to the spacers.

After the alcohol has evaporated, four small drops of a ultraviolet-curable adhesive are placed in the area of the spacers 140, 142. The two substrates 120, 122 are then placed together in the illustrated orientation with the buffed grooves of the two alignment layers perpendicular to each other and with the contact pads 124, 132 exposed to the side of the other substrate. The substrates 120, 122 are clamped together and optically inspected in the clamped state to assure their parallelism, and then the adhesive is partially cured with UV radiation. To obtain the maximum extinction ratio, the alignment directions of two substrates when assembled should be exactly perpendicular. Preferably, the non-perpendicularity should be less than ±1°.

Alternatively, the spacers are mixed in the UV curable epoxy before its application to form the spots 140, 142.

With the cured assembly held in the illustrated orientation, the assembly is heated to above the melting point of the liquid crystal, and one drop of a nematic liquid crystal is spread over the length of the top gap edge formed between the two substrates 120, 122. Capillary action pulls the melted liquid crystal into the entire area of the wedge-shape gap 82 between the substrates 120, 122. An example of a nematic liquid crystal is E7, available from E. Merck of Darmstadt, Germany. A suitable amount of chiral additive is added to the prevent the formation of reverse domains, for example, 0.5% of ZLI811 from Merck. Once the liquid crystal has been optically determined to fill the gap 82, the excess liquid crystal exposed on the exterior is wiped away, and the same UV-curable adhesive is applied to all exposed edges around the gap 82. A long exposure to UV radiation completely cures both sets of adhesive. The filling procedure described here is meant only as an illustrative example, and other methods may be employed.

The assembly is then mounted on the movable support 84, and the contact pads 124, 132 are electrically connected to the multi-signal biasing source. Thereafter, the vertical position of the liquid-crystal cell 80 is controlled so as to optimize performance by more closely matching the actual gap size to the minimum condition of Equation (4) or (5) for the nematic liquid crystal.

Figure 8:
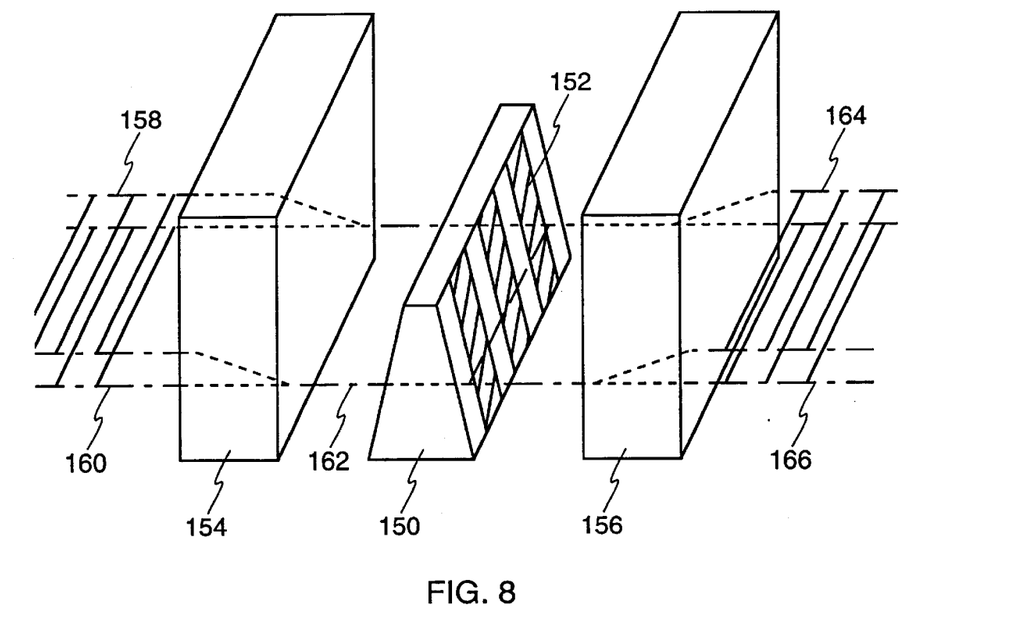
FIG. 8 is an orthographic schematic view of a polarization-sensitive embodiment of the optics surrounding a wedge-shaped liquid-crystal modulator.

As illustrated schematically in the orthographic view of FIG. 8, a wedge-shaped liquid-crystal modulator 150 with individually activatable segments 152 can be placed between two polarization-dispersive elements 154 and 156. Two input sheet beams 158, 160 are incident upon the input polarization-dispersive element 154, and the beam 158, 160 travel in parallel but are displaced from each other. The beams 158, 160 are shaped as sheets because an unillustrated wavelength-dispersive element has spread out the wavelength components across the sheets. For this polarization-sensitive embodiment, the two sheet beams 158, 160 are assumed to be orthogonally polarized so that the input polarization-dispersive element 154 deflects one beam 158 but does not deflect the other beam 160. The optical configuration is chosen such that input polarization-dispersive element 154 combines the two input beams 158, 160 into one combined sheet beam 162, which strikes the wedge-shaped liquid-crystal modulator 150 with the sheet 162 arranged perpendicularly to the length of the segments 152. Each segment operates upon two polarization-distinguished signals having a common wavelength to either leave both polarizations undisturbed or to exchange the polarizations of the two signals.

According to the invention, the wedge-shaped modulator 150 is vertically moved to optimize the transmission characteristics of the signals, particularly the polarization rotation.

The combined sheet beam 162 leaves the wedge-shaped modulator 150 and strikes the output wavelength-dispersive element 156 which separates each wavelength component according to polarization into output sheet beams 164, 166. An unillustrated wavelength-dispersive element shrinks each output sheet beam 164, 166 into respective pencil-shaped output beams.

The afore cited patents provide polarization-insensitive versions of the above optics.

Figure 9:
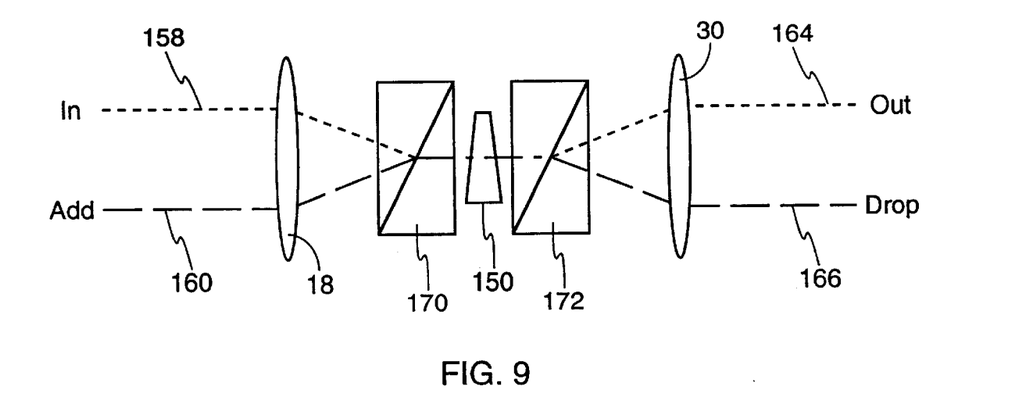
FIG. 9 shows an alternative embodiment to that of FIG. 8.

The transmission characteristics as a finction of lateral position, shown in FIG. 6, demonstrate that the point at which the beams strike the wedge-shaped liquid-crystal cell is critical. If two beams are being combined and the wavelength components of the two beams are being commonly polarization modulated, both beams must pass through the same point. The optical requirements are eased if Wollaston prisms are used to combine the beams, similarly to the technique of the second Patel and Silberberg patent. A polarization-sensitive embodiment is illustrated schematically in FIG. 9. The two input sheet beams 158, 160 of orthogonal polarizations are focused by the lens 18 onto a common line of an input Wollaston prism 170. This assures that the beams 158, 160 both pass through a common line on the wedge-shaped modulator 150. Another Wollaston prism 172 on the output side separates the modulated signals according to polarization into the output sheet beams 164, 166.

The described embodiments optimized performance by moving the wedge-shaped cell with respect to a fixed optical beam. Equivalent results are obtained by moving the beam with respect to a fixed cell.

Although the invention has been described for a wedge having straight sides with a linearly graded gap, the invention is not limited to such linear gaps but extends also to curved sides as long as the gap size varies monotonically over the operational range. The gap and its variation can be established by other means than rod spacers, for example, a flexible spacer that is compressed on one side.

Although the invention has been described in the context of a twisted nematic liquid crystal, other liquid crystal may advantageously be used with the invention. Supertwisted nematics having a twist angle of more than 90° may be used. Other liquid crystals may be used that benefit from a precisely defined thickness for the liquid crystal.

Although the invention has been motivated by segmented liquid-crystal modulator cells used in wavelength-division multiplexed (WDM) communications networks, the invention is not so limited and may be applied to other liquid-crystal cells used as full or partial modulators and as polarization rotators in many applications. The communications application is not required. The same beneficial results can be obtained with a non-segmented liquid-crystal cells.

The invention thus provides an easy method of achieving closely determined gaps in liquid-crystal cells, and the gap may be effectively adjusted after the cell assembly and during its use.

What is claimed is:

1. A liquid-crystal cell, wherein the two substrate assemblies are with a wedge-shaped gap fixed between said assemblies and filled with a liquid crystal comprising a twisted nematic liquid crystal;
   wherein each of said assemblies comprises at least one electrode and an alignment layer aligned in an alignment direction and disposed adjacent to said gap;
   wherein said alignment layers of said two assemblies have respective directions of alignment that are substantially perpendicular to each other;
   wherein said twisted nematic liquid crystal has a minimum transmissivity condition for a size of said gap intermediate between minimum and maximum sizes of said gap; and
   wherein the substrate assemblies form a gap that vanes monotonically and non-linearly.

2. The liquid-crystal cell of claim 1, wherein the two substrate assemblies are curved resulting in a wedge-shaped gap that varies monotonically and non-linearly.

3. The liquid-crystal cell of claim 2, further comprising two pairs of spacers having different sizes, separating said assemblies, and establishing said wedge-shaped gap.

4. The liquid-crystal cell of claim 2, wherein the curvature of the two substrate assemblies is approximated by a plurality of straight segments wherein the angular displacement of any segment is different from an adjacent segment.

5. The liquid-crystal cell of claim 1, wherein one of the two substrate assemblies is straight and other of the two substrate assemblies is curved resulting in a wedge-shaped gap that varies monotonically and non-linearly.

6. The liquid-crystal cell of claim 5, wherein the curvature of the second of the substrate assemblies is approximated by a plurality of straight segments wherein the angular displacement of any segment is different from an adjacent segment.

7. The liquid-crystal cell of claim 5, further comprising two pairs of spacers having different sizes, separating said assemblies, and establishing said wedge-shaped gap.

8. A liquid-crystal cell, comprising two substrate assemblies with a wedge-shaped gap fixed between said assemblies and filled with a liquid crystal;
   wherein each of said assemblies comprises at least one electrode and an alignment layer aligned in an alignment direction and disposed adjacent to said gap;
   wherein one of said at least one electrode comprises a plurality of electrode fingers extending in parallel; and
   wherein the substrate assemblies form a gap that varies monotonically and non-linearly.

9. The liquid-crystal cell of claim 8, wherein the two substrate assemblies are curved resulting in a wedge-shaped gap that varies monotonically and non-linearly.

10. The liquid-crystal cell of claim 9, wherein said alignment layers of said two assemblies have respective directions of alignment that are substantially perpendicular to each other.

11. The liquid-crystal cell of claim 10, wherein said liquid crystal comprises a twisted nematic liquid crystal.

12. The liquid-crystal cell of claim 9, wherein the alignment layer adjacent to said electrode fingers is aligned parallel to said electrode fingers.

13. The liquid-crystal cell of claim 12, wherein said two alignment layers are aligned in substantially perpendicular directions.

14. The liquid-crystal cell of claim 9, wherein the curvature of the two substrate assemblies is approximated by a plurality of straight segments wherein the angular displacement of any segment is different from an adjacent segment.

15. The liquid-crystal cell of claim 8, wherein one of the two substrate assemblies is straight and other of the two substrate assemblies is curved resulting in a wedge-shaped gap that varies monotonically and non-linearly.

16. The liquid-crystal cell of claim 15, wherein said alignment layers of said two assemblies have respective directions of alignment that are substantially perpendicular to each other.

17. The liquid-crystal cell of claim 16, wherein said liquid crystal comprises a twisted nematic liquid crystal.

18. The liquid-crystal cell of claim 16, wherein said two alignment layers are aligned in substantially perpendicular directions.

19. The liquid-crystal cell of claim 15, wherein the alignment layer adjacent to said electrode fingers is aligned parallel to said electrode fingers.

20. The liquid-crystal cell of claim 15, wherein the curvature of the second of the substrate assemblies is approximated by a plurality of straight segments wherein the angular displacement of any segment is different from an adjacent segment.

* * * * *